United States Patent
Yang et al.

(10) Patent No.: US 6,657,840 B2
(45) Date of Patent: Dec. 2, 2003

(54) PROTECTING CIRCUIT OF HORIZONTAL TRANSISTOR

(75) Inventors: Hsin-Chung Yang, Zhongli (TW); Chih-Hsin Lin, Taoyuan (TW)

(73) Assignee: Benq Corporation, Taoyuan (TW)

( * ) Notice: Subject to any disclaimer, the term of this patent is extended or adjusted under 35 U.S.C. 154(b) by 233 days.

(21) Appl. No.: 09/956,242

(22) Filed: Sep. 20, 2001

(65) Prior Publication Data

US 2002/0079744 A1 Jun. 27, 2002

(30) Foreign Application Priority Data

Sep. 21, 2000 (TW) ........................................ 89119536 A

(51) Int. Cl.[7] ............................ H02H 3/24; H01J 29/70
(52) U.S. Cl. ............................................ 361/92; 315/411
(58) Field of Search ........................ 361/88, 92; 315/364, 315/368.18, 411

(56) References Cited

U.S. PATENT DOCUMENTS

| 3,706,023 A | * | 12/1972 | Yamada et al. ............. 315/411 |
| 3,714,495 A | * | 1/1973 | Boekhorst .............. 315/368.18 |
| 3,949,167 A | * | 4/1976 | Koyama et al. ............ 348/746 |
| 4,728,868 A | * | 3/1988 | Ishikawa et al. ............ 315/411 |
| 5,262,684 A | * | 11/1993 | Kashiwagi .................. 327/108 |
| 5,517,090 A |   | 5/1996 | Bando |
| 6,091,212 A | * | 7/2000 | Park ........................... 315/370 |
| 6,211,855 B1 | * | 4/2001 | Kim ........................... 345/660 |
| 6,285,142 B1 | * | 9/2001 | Kim ........................... 315/371 |

FOREIGN PATENT DOCUMENTS

DE        196 19 697 A1        11/1996

* cited by examiner

*Primary Examiner*—Adolf D Berhane
(74) *Attorney, Agent, or Firm*—Rabin & Berdo, P.C.

(57) ABSTRACT

A protecting circuit for a horizontal transistor used for protecting the horizontal transistor of a horizontal deflecting circuit in a cathode ray tube. The protecting circuit comprises a switching circuit and a power sensor. The switching circuit is coupled to at least one sub capacitor of a S-character correcting loop. When the switching circuit is on, the switching circuit further connects the sub capacitors and the main capacitor of the S-character correcting loop in parallel. The power sensor is for detecting whether the D.C. voltage source is on. When the power sensor detects that the D.C. voltage source is off, the power sensor will turn on the switching circuit. The invention reduces a surge of the cross voltage $V_{CE}$ of the horizontal transistor when the system is off, therefore the invention achieves the goals of protecting the horizontal transistor and raising yield of the products.

16 Claims, 3 Drawing Sheets

PROTECTING CIRCUIT OF HORIZONTAL TRANSISTOR

This application incorporates by reference of Taiwan application Serial No. 89119536, Filed Sep. 21, 2000.

BACKGROUND OF THE INVENTION

1. Field of the Invention

The invention relates in general to a protecting circuit for a horizontal transistor, and more particularly to a protecting circuit in a horizontal transistor in cathode ray tubes.

2. Description of the Related Art

Recently, the electronics industry has shown a great improvement in the technology. For example, the consumer electronics company can make a color TV with a large-scale screen, high resolution and high tone quality. The color TV uses a cathode ray tube (CRT) as an electrical image display device since the CRT provides a fast image display with sufficient brightness and excellent color reconstruction. A synchronous deflecting circuit is an essential part of the CRT and in order to ensure the quality of the image reconstruction, the synchronous deflecting circuit includes a vertical deflecting circuit and a horizontal deflecting circuit.

The vertical deflecting circuit is for deflecting the electron beam in the vertical (up and down) direction and the horizontal deflecting circuit is for deflecting the electron beam in the horizontal (left and right) direction. Referring to FIG. 1, it shows a conventional horizontal deflecting circuit, which includes a horizontal driving circuit, a horizontal output circuit and a S-character correcting loop.

The horizontal driving circuit 102, which includes a driving transistor Q1, a horizontal driving transformer T1, a resistor R1, and a regulating capacitor C1, is for controlling the on/off status of the horizontal transistor Q2. A horizontal driving signal H-SYNC is sent to the driving transistor Q1. The horizontal output circuit 104 consists of a horizontal transistor Q2, a zener diode D1, and a capacitor CT. The current flows to the a horizontal deflecting winding 106 as a saw-toothed signal from the horizontal output circuit 104. The S-character correcting loop 108 is for solving the over-deflection of the electron beam near the tube of the CRT. The horizontal deflecting winding 106 and the S-character correcting loop 108 are connected in series by a horizontal linear coil 110.

In a large-scale CRT, in order to be operated in different horizontal deflecting frequencies, the S-character correcting loop 108 includes a main capacitor CS and many sub capacitors CS0, CS1, CS2, . . . CSx. The sub capacitors are all connected to the main capacitor CS in parallel. Each sub capacitor CS0, CS1, CS2, . . . CSx (e.g. CS0) is connected to a controlled switch SW0, SW1, SW2, . . . SWx (e.g. SW0) and each controlled switch SW0, SW1, SW2, . . . SWx (e.g. SW0) is controlled by a control signal CTL0, CTL1, CTL2, . . . CTLx (e.g. CTL0) from the CPU (not illustrated). The CPU chooses the sub capacitor, which is connected to the main capacitor CS in parallel, by a horizontal deflecting frequency output control signal CTL0, CTL1, CTL2, . . . CTLx. Therefore, the CRT adjusts a correcting capacitance according to the horizontal deflecting frequency. The correcting capacitance is the equivalent capacitance of the S-character correcting loop 108. In FIG. 1, the value of x (CSx, SWx, CTLx) is 4. The output voltage of a D.C. voltage source B+ under normal circumstances is a standard value, for example, the standard value is 12 V, and the tolerable variance of the D.C. voltage source B+ is 5%. That is, the output voltage is 12.6V~11.4V.

For example, the horizontal deflecting frequency is 31 KHz to 36 KHz. The control signals CTL0, CTL1, CTL2, CTL3, and CTL4 from the CPU are all at logic 0. The controlled switches SW0, SW1, SW2, SW3, and SW4 are all on and the correcting capacitance of the S-correcting loop 108 equals to the sum of the main capacitor CS and the sub capacitors CS0, CS1, CS2, CS3, and CS4.

When the system is off, the output voltage of the D.C. voltage source B+ decreases gradually from the standard value to zero. However, when the output voltage of the D.C. voltage source B+ just decreases 5% from its standard value, the CPU misjudges that the system is in an abnormal status and the CPU resets the system. Therefore, all of the output signals from the CPU are set to logic 1. That is, the control signals CTL0, CTL1, CTL2, CTL3, and CTL4 are set to logic 1 and turn off the controlled switches SW0, SW1, SW2, SW3, and SW4. Then, the sub capacitors CS0, CS1, CS2, CS3, and CS4 are not connected in parallel with the main capacitor CS, and the correcting capacitance is equal to the main capacitor CS.

In the circumstances, voltage $V_{CE}$, the output voltage V of the horizontal output circuit 104, between the collector and the emitter of the horizontal transistor Q2, includes a surge due to the decrease of the correcting capacitance. For example, under normal circumstances, voltage $V_{CE}$ of the horizontal transistor Q2 is about 1000V~1100V. However, the voltage $V_{CE}$ of the horizontal transistor Q2 will be 1400V due to the surge when the CPU reset the system. The surge will damage the horizontal transistor Q2 seriously and decrease yield of the product.

SUMMARY OF THE INVENTION

It is therefore an object of the invention to provide a protecting circuit for a horizontal transistor. When the protecting circuit detects that the output voltage of the D.C. voltage source decreases to a threshold voltage, a switching circuit is on and at least one sub capacitor is connected to the main capacitor in parallel. Therefore, a surge of the cross voltage of the horizontal transistor is reduced and yield of the products is raised.

The invention achieves the above-identified objects by providing a protecting circuit for a horizontal transistor used in a horizontal deflecting circuit of a cathode ray tube. The horizontal deflecting circuit includes a horizontal driving circuit, a horizontal output circuit, and a S-character correcting loop. A D.C. voltage source provides a D.C. voltage to the horizontal deflecting circuit. The horizontal output circuit includes the horizontal transistor and the S-correcting loop includes a main capacitor, at least one sub capacitor, and at least one controlled switch. The controlled switch is for connecting the sub capacitor and the main capacitor in parallel selectively. The protecting circuit of the invention includes a switching circuit and a power sensor. The switching circuit is coupled to at least one sub capacitor. The switching circuit further connects the sub capacitor and the main capacitor in parallel when the switching circuit is on. The power sensor is for determining whether the D.C. voltage source is on. When the D.C. voltage source is off, the power sensor turns on the switching circuit.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
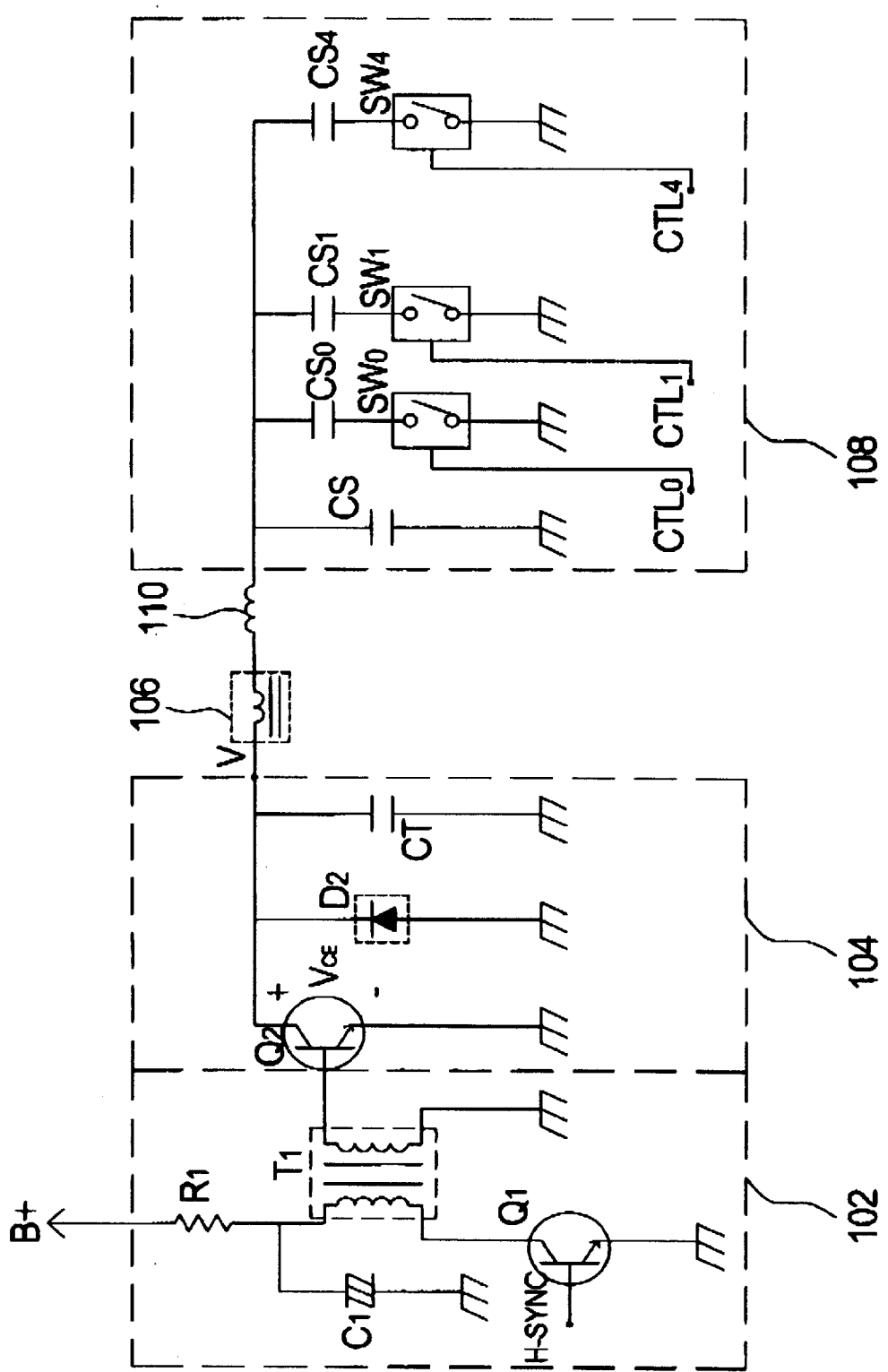
FIG. 1 illustrates a conventional horizontal deflecting circuit, which includes a horizontal driving circuit, a horizontal output circuit, and a S-character correcting loop.
Figure 2:
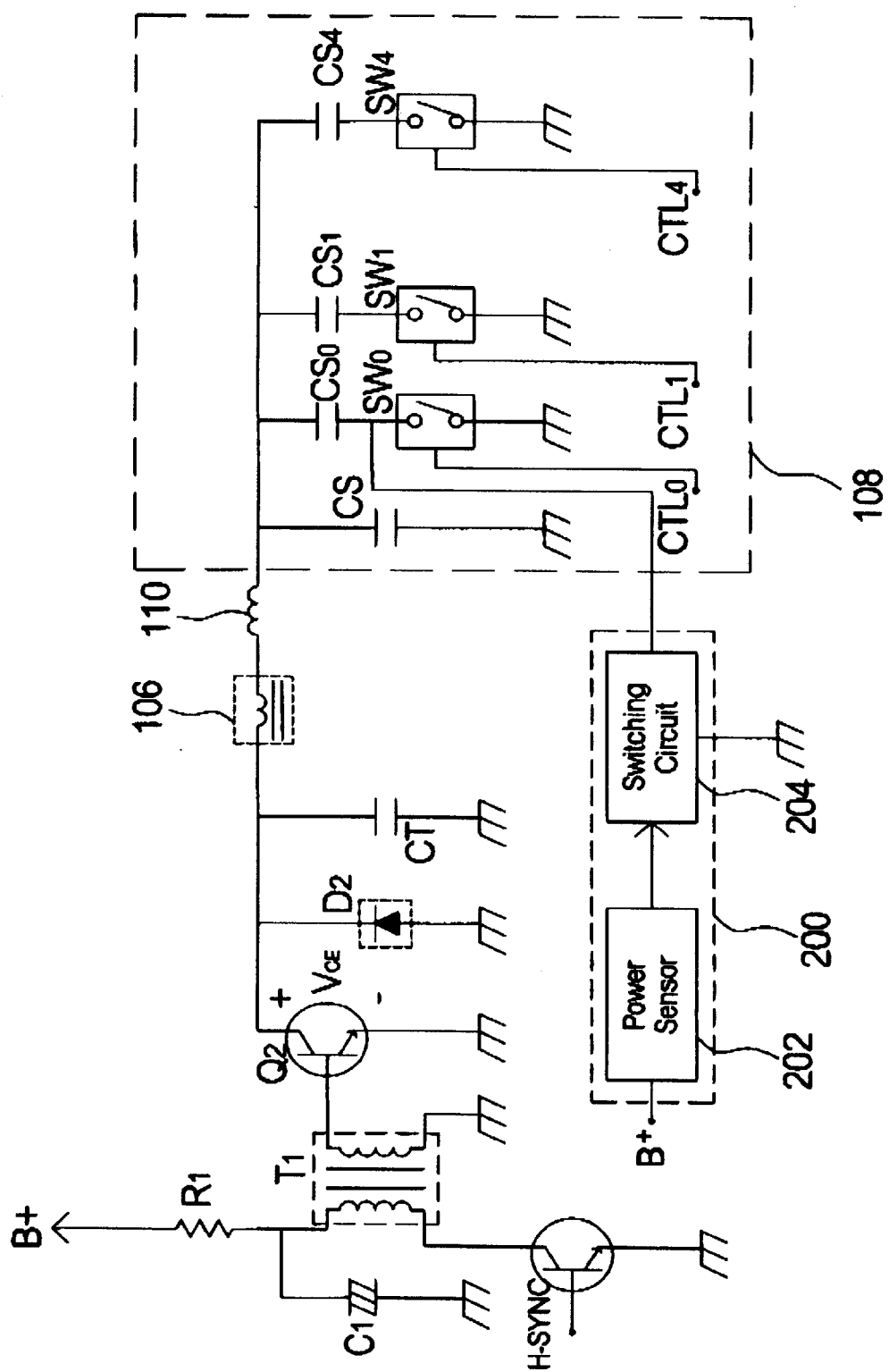
FIG. 2 illustrates a circuit diagram of a protecting circuit for a horizontal transistor according to the preferred embodiment of the invention.

Refers to FIG. 2, it illustrates a circuit diagram of a protecting circuit for a horizontal transistor according to the preferred embodiment of the invention. The protecting circuit 200 in the horizontal transistor of the invention can be used in a display unit. The protecting circuit 200 of the horizontal transistor includes a power sensor 202 and a switching circuit 204. The switching circuit 204 is connected to at least one sub capacitor in the S-character correcting loop 108, for example, the sub capacitor CS0. When the switching circuit 204 is on, the sub capacitor CS0 and the main capacitor CS are connected in parallel. The power sensor 202 is for detecting the on/off status of the D.C. voltage source B+. The power sensor 202 turns on the switching circuit 204 when the power sensor 202 detects that the D.C. voltage source B+ is off. The power sensor 202 determines whether the D.C. voltage source B+ is on by the output voltage of the D.C. voltage source B+. For example, when the output voltage of the D.C. voltage source B+ decreases to a threshold value Vr, the power sensor 202 turns on the switching circuit 204.

When the system is off, the output voltage of the D.C. voltage source B+ will decrease gradually to 0. When the output voltage of the D.C. voltage source B+ decreases to the threshold voltage Vr, the CPU will misjudge that the system is in an abnormal status and reset the system. Therefore, all of the control signals CTL0, CTL1, CTL2, CTL3, and CTL4 will be set to high level (logic 1) and the controlled switches SW0, SW1, SW2, SW3, and SW4 turn off. At the same time, the power sensor 202 turns on the switching circuit 204 and at least one sub capacitor, for example, a sub capacitor CS0 which is connected to the main capacitor CS in parallel. Thus the correcting capacitance of the S-character correcting loop 108 is the capacitance of the sum of the main capacitor CS and the sub capacitor CS0. The protecting circuit for the horizontal transistor of this invention has a larger capacitance of the S-character correcting loop 108 than that (the capacitance of the main capacitor) of conventional circuit when the system turns off or when there is a voltage variance of the D.C. voltage source B+. Thus, the protecting circuit reduces a surge of the voltage $V_{CE}$ of the horizontal transistor Q2 and protects the horizontal transistor Q2.

Figure 3:
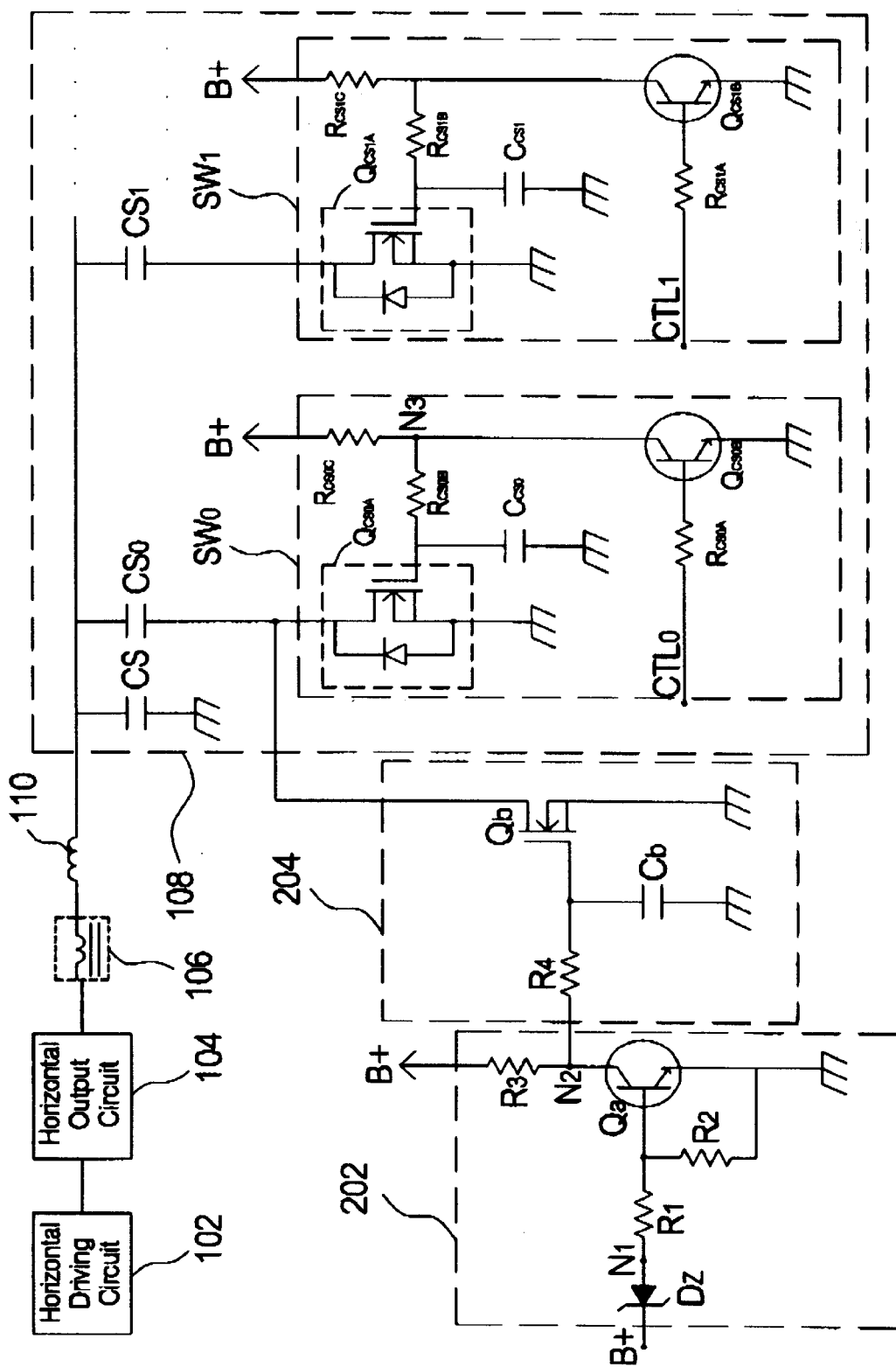
FIG. 3 illustrates an example of the protecting circuit of the horizontal transistor in FIG. 2.

Referring to FIG. 3, it illustrates an example of the protecting circuit of the horizontal transistor in FIG. 2. FIG. 3 illustrates the detailed circuit of the controlled switches SW0 and SW1, and the controlled switches are connected to the sub capacitor CS0 and CS1 respectively. When the S-character correcting loop 108 is not connected to the protecting circuit of the horizontal transistor, the controlled switch SW0 includes a transistor $Q_{CS0A}$, a transistor $Q_{CS0B}$, a resistor $R_{CS0A}$, a resistor $R_{CS0C}$, and a capacitor $C_{CS0}$. When the control signal CTL0 is at logic 1, the transistor $Q_{CS0B}$ is on and the node N3 is at logic 0. At the same time, the transistor $Q_{CS0A}$ is off and the sub capacitor CS0 is open. On the other hand, when the control signal CTL0 is at logic 0, the transistor $Q_{CS0B}$ is off and the node N3 is at logic 1. At the same time, the transistor $Q_{CS0A}$ is on and the sub capacitor CS0 is connected to ground and is connected to the main capacitor CS in parallel. The controlled switch SW1 includes a transistor $Q_{CS1A}$, a transistor $Q_{CS1B}$, resistors $R_{CS1A}$, $R_{CS1B}$, $R_{CS1C}$, and a capacitor $C_{CS1}$ and its operation is the same as the controlled switch SW0.

The power sensor 202 of the protecting circuit 200 of the horizontal transistor includes a voltage shifting device and a transistor Qa. The voltage shifting device receives the output voltage of the D.C. voltage source B+, shifts the output voltage to a fixed voltage, and sends the fixed voltage to the transistor Qa. When the output voltage of the D.C. voltage source B+ is larger than the threshold voltage Vr, the transistor Qa is on, the power sensor 202 sends a signal with logic 0 to the switching circuit 204, and the switching circuit 204 is disconnected to the S-character correcting loop 108. When the output voltage of the D.C. voltage source B+ is smaller than the threshold voltage Vr, the transistor Qa is off, the power sensor 202 sends a signal with logic 1 to the switching circuit 204, and the switching circuit 204 is on.

The switching circuit 204 includes a switch. When the switching circuit 204 is on, the switch of the switching circuit 204 is on, the switching circuit 204 connects the sub capacitor CS0 of the S-character correcting loop and the main capacitor CS in parallel. When the switching circuit 204 is off, the switch of the switching circuit 204 is off and the switching circuit 204 and the S-character correcting loop 108 are disconnected.

The voltage shifting device is, for example, a zener diode Dz. The switch of the switching circuit 204 is, for example, a transistor Qb. The threshold voltage Vr is, for example, 5% lower than the standard value of the D.C. voltage source B+. For example, if the standard value of the D.C. voltage source is 12V, the threshold voltage Vr is 11.4V. At the same time, the breakdown voltage of the zener diode Dz is, for example, 11V and the upper limit of the voltage across the base and the emitter, which keeps the transistor Qa in the off state, is 0.4 V.

In FIG. 3, the power sensor 202 further includes resistors R1, R2, and R3. The switching circuit 204 further includes a capacitor Cb and a resistor R4. Under normal circumstances, the voltage at node N1 is 1V and the transistor Q1 is on. The power sensor 202 outputs a logic 0 (low level) signal from node N2. When the switching circuit 204 receives the logic 0 signal, the transistor Qb is off and the switching circuit 204 and the S-character correcting loop 108 are disconnected. In other words, the power sensor 202 and the switching circuit 204 don't affect normal operations of the S-character correcting loop 108 under normal circumstances, for example, before the system shuts down.

When the system is shut down, the output voltage of the D.C. voltage source B+ gradually decreases to zero. When the output voltage decreases to the threshold voltage Vr 11.4V, the CPU resets the system and all of the control signals CTL0–CTL4 are all at logic 1. At the same time, since the output voltage of the D.C. voltage source B+ decreases to the threshold voltage Vr 11.4V, the voltage at the node N1 decreases to 0.4V and the transistor Qa is off. Therefore, the voltage at node N2 changes to high level (logic 1), and the power sensor 202 sends a logic 1 signal to the switching circuit 204. When the switching circuit 204 receives the logic 1 signal, the transistor Qb is on. Then, the sub capacitor CS0 is ground and the sub capacitor CS0 and the main capacitor CS are connected in parallel. Thus, the correcting capacitance of the S-character correcting loop 108 is the sum of the capacitance of the main capacitor CS and the sub capacitor CS0. Therefore, the value of the correcting capacitance is larger than that of the conventional settings and the surge of the voltage $V_{CE}$ of the horizontal transistor is reduced.

Although the above explanation only discloses connections between one sub capacitor and the main capacitor, it is obvious that one can connects more than one sub capacitors to the main capacitor to further increase the correcting capacitance in order to reduce the surge when the power is off and protect the horizontal transistor. For example, one can connects two (or more) switching circuits 204 to two (or more) sub capacitors. Then, there are two (or more) sub capacitors connected in parallel to the main capacitor. The correcting capacitance is further increased. When the standard value of the D.C. voltage source B+ is changed, one just needs to change the parameters of the voltage shifting devices, for example, uses a zener diode with a different threshold voltage.

The protecting circuit for a horizontal transistor according to the preferred embodiment of the invention reduces the surge of the cross voltage $V_{CE}$ of the transistor, protects the horizontal transistor and raises yield of the products.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A protecting circuit for a horizontal transistor used in a horizontal deflecting circuit of a cathode ray tube, the horizontal deflecting circuit comprising a horizontal driving circuit, a horizontal output circuit, and a S-character correcting loop, wherein a D.C. voltage is provided by a D.C. voltage source to the horizontal deflecting circuit, the horizontal output circuit comprises the horizontal transistor, the S-correcting loop comprises a main capacitor, a sub capacitor, and a controlled switch, the controlled switch is used for selectively connecting the sub capacitor and the main capacitor in parallel, the protecting circuit comprising:
   a switching circuit coupled to the controlled switch, the controlled switch electrically connecting the sub capacitor and the main capacitor in parallel when the switching circuit being on; and
   a power sensor coupled to the D.C. voltage source and the switching circuit, the power sensor detecting a status of the D.C. voltage source and controlling the switching circuit, wherein the power sensor turning on the switching circuit when the D.C. voltage source being substantially reduced.

2. The protecting circuit according to claim 1, wherein the power sensor determines whether the D.C. voltage source is substantially reduced by detecting a output voltage of the D.C. voltage source, and the power sensor turns on the switching circuit when the output voltage of the D.C. voltage source decreases to a threshold voltage.

3. The protecting circuit according to claim 2, wherein the threshold voltage is 5% lower than a standard value of the output voltage of the D.C. voltage source.

4. The protecting circuit according to claim 2, the power sensor comprising a voltage shifting device and a second transistor, wherein the voltage shifting device receives the output voltage from the D.C. voltage source, shifts the output voltage to a fixed voltage, and sends the shifted output voltage to the second transistor;
   when the output voltage of the D.C. voltage source is greater than the threshold voltage, the second transistor is on and the power sensor outputs a first level signal to the switching circuit to disconnect the switching circuit and the S-character correcting loop;
   when the output voltage of the D.C. voltage source is smaller than or equal to the threshold voltage, the second transistor is off and the power sensor outputs a second level signal to the switching circuit to turns on the switching circuit.

5. The protecting circuit according to claim 4, wherein the voltage shifting device is a zener diode.

6. The protecting circuit according to claim 4, wherein the first level signal is a low level signal and the second level signal is a high level signal.

7. The protecting circuit according to claim 1, the switching circuit further comprising a first switch, wherein when the switching circuit is on, the first switch is on and connects the sub capacitor of the switching circuit and the main capacitor in parallel.

8. The protecting circuit according to claim 7, wherein the first switch is a transistor.

9. A display unit with a protecting circuit for a horizontal transistor, the display unit comprising a horizontal deflecting circuit, the horizontal deflecting circuit comprising a horizontal driving circuit, a horizontal output circuit, and a S-character correcting loop, wherein a D.C. voltage is provided by a D.C. voltage source to the horizontal deflecting circuit, the horizontal output circuit comprises a horizontal transistor, the S-character correcting loop comprises a main capacitor, at least one sub capacitor and at least one controlled switch, the controlled switch is used for selectively connecting the sub capacitor and the main capacitor in parallel, the protecting circuit comprising:
   a switching circuit coupled to the controlled switch, the controlled switch electrically connecting the sub capacitor and the main capacitor in parallel when the switching circuit being on; and; and
   a power sensor coupled to the D.C. voltage source and the switching circuit, the power sensor detecting a status of the D.C. voltage source and controlling the switching circuit, wherein the power sensor turning on the switching circuit when the D.C. voltage source being substantially reduced.

10. The display unit according to claim 9, wherein the power sensor determines whether the D.C. voltage source is substantially reduced by detecting a output voltage of the D.C. voltage source, and the power sensor turns on the switching circuit when the output voltage of the D.C. voltage source decreases to a threshold voltage.

11. The display unit according to claim 10, wherein the threshold voltage is 5% lower than a standard value of the output voltage of the D.C. voltage source.

12. The display unit according to claim 10, the power sensor comprising a voltage shifting device and a second transistor, wherein the voltage shifting device receives the output voltage from the D.C. voltage source, shifts the output voltage to a fixed voltage, and sends the shifted output voltage to the second transistor;
   when the output voltage of the D.C. voltage source is greater than the threshold voltage, the second transistor is on and the power sensor outputs a first level signal to the switching circuit to disconnect the switching circuit and the S-character correcting loop;

when the output voltage of the D.C. voltage source is smaller than or equal to the threshold voltage, the second transistor is off and the power sensor outputs a second level signal to the switching circuit to turns on the switching circuit.

13. The display unit according to claim 12, wherein the voltage shifting device is a zener diode.

14. The display unit according to claim 12, wherein the first level signal is a low level signal and the second level signal is a high level signal.

15. The display unit according to claim 9, the switching circuit further comprising a first switch, wherein when the switching circuit is on, the first switch is on and connects the sub capacitor of the switching circuit and the main capacitor in parallel.

16. The display unit according to claim 15, wherein the first switch is a transistor.

* * * * *